Patented Aug. 16, 1938

2,127,074

UNITED STATES PATENT OFFICE 2,127,074

IMPROVING CHROME ORES

Marvin J. Udy, Niagara Falls, N. Y.

No Drawing. Application September 21, 1937,
Serial No. 164,988

20 Claims. (Cl. 75—1)

This invention or discovery relates to improving chrome ores; and it comprises a method of making an improved chrome ore, wherein metallic oxide ore, such as a chromite ore containing ferrous chromite, is enriched in chromium and deprived of iron by fusion with ferrochrome resulting from reduction of chromite, and which may contain carbon, silicon, or both, fusion being in an electric furnace and in the presence of a base to produce an ore rich in basic chromite and having a high chromium:iron ratio, the enriched ore and the low-chromium iron produced being collected as two products; all as more fully hereinafter set forth and as claimed.

In a prior and copending application Serial No. 716,433, filed March 19, 1934, (Patent No. 2,098,-176) wherewith the present application has certain matter in common, and of which this application is in part a continuation, I have described and claimed various ways of producing from a low-grade chromite ore an improved chromite ore useful in producing commercial ferrochromium with a high chromium:iron ratio, now made only from overseas ores. Standard commercial ferrochromium should have not less than a 2:1 ratio of chromium to iron, lower ratios not being merchantable. As it chances, there are no available ores on the American continent which will give this 2:1 ratio or the still higher ratios demanded by the market, while at the same time having a sufficiently high chromium content to render them desirable source materials for the manufacture of ferrochromium. High-grade ferrochromium should have at least a 70:30 ratio. Such a ferrochromium can be obtained by direct total reduction of the contained metals in chromite ores from New Caledonia, Rhodesia and elsewhere but not from domestic ores. These foreign ores have a part of the FeO of the ferrous chromite ($FeO.Cr_2O_3$) replaced by MgO, giving a higher ratio of chromium to iron.

So far as I am aware, few, if any, natural ores of sufficiently high concentration to make them desirable raw materials for direct reduction to ferro-chromium, have Cr:Fe ratios as high as 77:23. By my process, however, it is possible to prepare synthetic chromite ores having Cr:Fe ratios of 77:23 and higher.

Pure ferrous chromite of the theoretical composition, on total reduction, does not give a high grade ferrochromium, the chromium:iron ratio being only 64.8:35.2. Direct fractional reduction of Fe from $FeO.Cr_2O_3$ to give a bettered ore has not been found to be practicable. Chromite is a mineral of the spinel type and this mineral must be broken up before reduction is feasible. I discovered, however, that if the chromite ore be melted in an electric furnace in the presence of sufficient CaO and a reducing agent I can reduce and remove iron, leaving the $Cr_2O_3$ behind as calcium chromite. In other words, ferrous chromite is converted into basic chromite and iron, the iron being sent out of the system.

In a specific embodiment described and claimed in the companion application, enrichment of chromite ores in chromium is effected by a subtraction of iron; the iron being replaced by calcium. In making an ore yielding a 70:30 ratio from a chromite ore with a lower ratio, lime and coke are used to displace and reduce the desired amount of iron, leaving only enough iron to give a 70:30 metal on total reduction.

In another embodiment of the invention set forth in my aforesaid copending application, and with which embodiment the present application is concerned, improvement in the chromium:iron ratio is effected not only by subtraction of iron but also by addition of chromium, the ore being fused in an electric furnace with lime and with ferrochromium metal coming from the total reduction of another portion of chromite ore. In the total reduction gangue is slagged off. In the subsequent step, the chromium of the ferrochromium is added to the ore, reducing some of the iron therein. The iron so reduced, together with the original iron of the ferrochromium, leaves the system as a byproduct, while the chromium oxidized joins that in the ore as calcium chromite, giving a basic ore melt of increased chromium content and lowered iron content; this melt constituting the new basic ore and consisting predominantly of calcium chromite. The ideal reaction may be written as follows:

$$4CaO + 3FeO.Cr_2O_3 + 2Cr = 4CaO.Cr_2O_3 + 3Fe$$

Ordinarily the reduced iron and the melt are separately tapped or poured off and leave the system as separate products, but where desired the glassy melt may be removed from the furnace together with accompanying iron including that occurring in the cooled melt in the form of "shot metal", the melt being subsequently cooled, ground and separated to remove metallic iron and give the improved ore. There are marked advantages, however, in effecting the separation of metal and ore melt by tapping or pouring them from the furnace separately.

In the equation given, the reducing agent is chromium, i. e. that supplied by the ferrochromium used, and which is made by direct or "total" reduction of a different ore or another portion of the same ore. Various reducing agents may be used, i. e. carbon, ferrochromium, silicon, etc. In one embodiment described in the stated copending application, with which the present application deals, ferrochromium is used as a reducing agent. In using ferrochromium coming from the total reduction of chromite ore, with slagging off of impurities, as a means of enriching other chromite ore, a new ore is obtained carrying the chromium of both lots. The iron of both lots leaves the system as low-chromium metal. The gangue of one lot leaves the system as slag. The ore furnishing ferrochromium to be used as a reducing agent need not be a particularly rich ore nor need it necessarily have a high Cr:Fe ratio.

In reducing the chromite to make ferrochromium for use as a reducing agent in the subsequent improvement step, it is advantageous to form a slag having a 2:1 base-acid ratio, that is, a molecular ratio of lime and magnesia to silica and alumina equal to 2:1, lime being added in cases where the ore is not sufficiently basic in character to give such a slag. As described in my prior and copending application Serial No. 19,749, filed May 3, 1935, this adjustment of the slag ratio in making ferrochromium and a concomitant rise of temperature making this basic slag a free-running liquid, enables regular furnace operation with control of the carbon content of the metal. One of the outstanding advantages of this method of procedure is a high yield of chromium from the ore smelted. Another is the possibility of utilizing low grade ores and concentrates.

There are quite a variety of chromium ores available in the United States and Canada, but very few carry chromium and iron in the 2:1 ratio which would result, upon total reduction in the ordinary manner, in a 66 per cent ferrochromium. As stated, there are practically none with a higher ratio. Most ores have a lower ratio and there are vast deposits in which the Cr:Fe ratio is 1:1. Moreover, there are large deposits of ore which is poor in the sense that the total metal content thereof is low. These impure ores, like other ores, can be concentrated and freed of gangue by known washing and flotation expedients and by fine grinding and classification methods. These methods, however, are expensive and do not necessarily or often result in an improvement of the chromium:iron ratio.

Chromite is a mineral of the spinel type, $FeO.Cr_2O_3$, and not only is part of the FeO sometimes found replaced by MgO as in New Caledonia ores, but the $Cr_2O_3$ is sometimes found replaced by $Al_2O_3$ or $Fe_2O_3$. When the $Cr_2O_3$ is completely replaced by $Fe_2O_3$, the result is magnetite, also a spinel-type mineral. Much of the available chromite ore represents minerals somewhere intermediate chromite and magnetite. Classification and ore dressing methods are not successful in separating concentrates of higher chromium content from these ores.

In directly reducing the whole metal content of such an ore in an electric furnace, the bulk of the ore can be discarded as a slag, and the metal recovered is, so to speak, a concentrate. A slag is made by the addition of silica or lime, as the gangue may require. Usually I try to make a slag having 1:1 oxygen ratio between basic and acidic components. The mixture of ore and slag-forming constituents is fused in an electric furnace with sufficient coke to reduce all or most of the iron and chromium, as well as $CO_2$, and to give a slight excess. The metal and slag are topped off in the usual way. A typical metal concentrate made in this way from one particular ore carried chromium and iron in the ratio of 42:48, its analysis being as follows: Cr 42 per cent, Fe 48 per cent, Si 3 per cent and C 7 per cent.

This metal is not marketable as ferrochromium and there are considerable difficulties in the way of converting it into commercial chromium-iron alloys. However, this metal represents in the present invention a useful agent for effecting enrichment of the same or more concentrated chromite ores to a point where they become marketable as raw materials for the manufacture of standard ferrochromium, as well as metals containing 70 per cent or more Cr. It is so used in the present invention.

In a typical embodiment of the present invention I improved a chromium ore not quite rich enough to give marketable ferrochromium; an ore carrying chromium and iron in about a 60:40 ratio. This ore was put into reaction with such a metal concentrate, using about 1 part of concentrate to 5 parts of ore. Lime was added. Upon fusion in an electric furnace of the open-arc or Heroult type there was obtained a yield of low-chromium iron and a glassy melt consisting largely of calcium chromite and containing chromium and iron in such proportion as would give on total reduction a ferrochromium having a chromium:iron ratio of 70:30. While batch operation is ordinarily preferred, it is sometimes advantageous to operate continuously, for example in a submerged arc type furnace.

Operating in this manner, the chromium from the ore initially reduced joins the second ore to form a new basic ore melt of heightened chromium content, while the iron reduced from both ores is withdrawn as such, in the form of a low chromium-iron representing a valuable by-product.

My invention provides for considerable flexibility of operation, the results varying in accordance with the nature of the ore or ores handled, the relative concentrations and amounts of the same, the relative amounts of metal concentrate and ore employed in the second, or improvement step, and the extent to which replacement and reduction of iron is carried in the second step. All of these factors may be varied over a wide range. Thus I may obtain the metal concentrate from an ore, which may be one of low Cr content, and use it as reducing agent, with or without an additional reducing agent such as carbon, in the improvement of the same ore or of a different ore.

The invention is not limited to the use of any particular chrome iron ore in the second step, although it is especially useful for the improvement of certain ores of fairly high chromite content but falling somewhat short of the desired 2:1 ratio of chromium to iron. When high-chromium metal, or pure chromium is desired, as an end product, in the reduction of the improved ore, the ore used in the second step (treatment with a metal concentrate), may be one having a chromium to iron ratio in excess of 2:1, for example a high-grade New Caledonia ore.

As has been explained, ores of this type are ordinarily rich in MgO, the MgO being combined with $Cr_2O_3$. Other ores used in the beneficiating step may also contain fairly high percentages of MgO, present as $MgCO_3$. In the beneficiating step, the amount of lime added is ordinarily such as to give a ratio of basic constituents (CaO, MgO) to acidic constituents ($SiO_2$, $Al_2O_3$) equal to from 1.75:1 to 2:1, or even higher. However, even where the ore contains a high content of MgO and even where the magnesium is largely present as magnesium carbonate and hence has the effect of an added base, it is advantageous to add lime in the beneficiating step. The addition of lime protects the furnace lining and has the effect of giving a higher Cr:Fe ratio in the final ore product than would be possible otherwise.

While an object achieved in each and every instance of the invention is an improvement in the Cr:Fe ratio of the ore treated in the second or improvement step, always resulting in the production of a final ore product rich in $Cr_2O_3$ and having a Cr:Fe ratio in excess of 2:1, it will be apparent that the utility of my process is not confined, as to either step, to the treatment of ores having a Cr:Fe ratio lower than 2:1. The ore used in either or both steps may have a higher ratio.

From the foregoing, it will be clear that an important advantage and utility of the process resides in the concentration effected in the first step, whereby ore gangue is slagged off and removed. The final synthetic ore made with the aid of a metal concentrate and a natural ore contains whatever gangue may be present in the system. Insofar as gangue is slagged off in making the concentrate the gangue content of the synthetic ore is reduced. This makes it possible to handle ores of low concentration, while producing a final ore product not only having a high Cr:Fe ratio but containing a high content of Cr as $Cr_2O_3$, largely or entirely in the form of $CaO.Cr_2O_3$. The concentration is effected in a simple and economic manner. In one way of looking at this invention the gangue of part of the ore is removed as slag, giving a low gangue ratio when the metal of this part is added to a second part of ore.

Thus, starting with an ore A, having a low total chromium content and a Cr:Fe ratio lower than 2:1, wholly reducing this ore A and discarding the gangue as slag, and using the metal "concentrate" as a reducing agent (with lime) for the treatment of an ore B also having a Cr:Fe ratio lower than 2:1, it is possible to produce a final synthetic ore having a Cr:Fe ratio of 70:30 or higher, and also containing a higher percentage of Cr than either ore A or ore B, and hence representing an extremely advantageous source material for the manufacture of high-grade ferrochromium by reduction in the ordinary manner.

As I have discovered, by melting chromite ore of unmarketable grade in an electric furnace with a ferrochromium made as described, and with enough CaO to take care of the $Cr_2O_3$ contained originally in the ore as well as that formed by oxidation of the chromium in the ferrochromium I can produce a marketable ore of any desired high grade. Any desired proportion of iron may be removed, and in fact the reduction and removal of iron may be carried to the point where the product represents a calcium chromite ore free of substantially all iron.

It is possible to make the described chrome ore concentrate by first producing high carbon ferrochromium of any chromium content from natural chrome ore and then oxidizing the chromium and carbon of this ferrochromium with ordinary iron ore ($Fe_2O_3$) in the presence of a lime-silica bath which may be formed by fluxing the usual silica of the iron ore with lime in a ratio of 1.75 to 2 CaO to 1 $SiO_2$. In principle the operation is the same, the difference being that the ore used in oxidizing metallic chromium contributes no chromium to the final ore. But the result of an improved ore of a high Cr:Fe ratio with some or much of the $Cr_2O_3$ occurring as calcium chromite, is the same. The chromium of the ferrochromium is oxidized and the iron oxide is reduced under basic conditions. The products are a basic chromite ore melt high in chromium and a low-carbon iron alloy, low in chromium. The preparation of the altered chrome ore in this way can however be regulated and adjusted by proportioning the ferrochromium and iron ore so as to produce a substantially iron-free chrome ore melt and an underlying metal sufficiently high in chromium to allow its use in making commercial chromium steels and irons of various kinds. In fact the process can be so carried out as to give the proper chromium content in the reduced iron for any particular ferrous chromium alloy; it being subsequently necessary only to add to the separated metal the customary deoxidizers and other desired constituents.

In employing $Fe_2O_3$ in the manner described, a certain amount of oxidation, through contact with atmospheric air, is effected, and the amount of $Fe_2O_3$ is adjusted accordingly. This is especially the case in a batch operation conducted in a furnace of the open-arc or Heroult type.

In the specific operation set forth and claimed in the companion application Serial No. 716,433 (Patent No. 2,098,176) there is, so to speak, selective reduction of iron, while in the main operation described herein there is effected both a selective reduction of iron of the ore and a selective oxidation of the chromium of the ferrochromium metal used. The result is an exchange: the chromium of the metal goes into and enriches the ore and iron from the ore joins that in the metal.

Synthetic ores made in accordance with the invention described herein are readily reduced in the ordinary manner to ferrochromium of the desired chromium:iron ratio and can be used in making low-carbon ferrochromium by reduction with ferrosilicon or ferrochrome silicon.

Those products containing very high percentages of calcium chromite are especially suitable for the production of chromates. Thus, when one synthetic ore produced by my process, and high in calcium chromite, was admixed with lime and roasted, in the presence of moisture, there was an ample production of calcium chromate, readily leached from the roasted product. On addition of some sulfuric acid, the roasted product gave leachings of calcium bichromate. From the bichromate, other chromates can be made. Thus a solution of chromic acid can be made by precipitation of the lime in solution as calcium sulfate.

In many instances, (as in Example I, given hereinbelow) the purpose is to secure a final ore product consisting to a very high extent of calcium chromite; that is to say, to approximate the ideal reaction given hereinabove, and to secure the reduction and removal of iron from the ore treated in the beneficiating step to as complete an extent as possible.

Naturally there are difficulties in the way of producing a pure calcium chromite product directly, apart from its high melting point. One is that it requires a pure gangue-free ore. Gangue components not slagged off join the chromite. There are also mechanical difficulties in the way of effecting complete reduction and removal of iron under practical working conditions and within a practical operating time.

When complete reduction and removal of iron in making a synthetic or beneficiated ore is aimed at, there must be sufficient chromium or other reducing agent present to effect this complete reduction, and there must be a sufficient amount of added CaO or other base present in the system to ensure the formation of basic chromite. Due regard must of course be paid to any carbon present in the metal concentrate employed as a reducing agent, which for this purpose may be a high-carbon alloy, and also to the presence of any material such as silicon, which may tend to consume preferentially a portion of the CaO employed.

It will be understood, however, that in many instances extremely advantageous results may be secured without attempting to get rid of iron completely. In every aspect of my invention, however, conditions are so regulated and adjusted as to remove, as slag, the gangue present in the ore employed to furnish the metal concentrate, the separation between metal and slag being carried to as great an extent as is feasible. There is little point in securing a recovery of less than 80 per cent of the recoverable metals, iron and chromium, present in the ore so used.

Also in every aspect of my invention, the conditions are so regulated and controlled, insofar as the second or beneficiating step is concerned, as to secure as final product a synthetic ore having a high percentage content of $Cr_2O_3$, and a higher Cr:Fe ratio then the raw ore. Enough reducing agent and enough base must always be present to effect this result. Moreover, it is always desirable to employ enough reducing agent to secure a final ore melt having a Cr:Fe ratio at least as high as that present in standard ferrochromium, and advantageously equal to 70:30 or higher.

In my copending application Serial No. 716,433, the use of a submerged arc furnace was stressed, the operation being continuous in the sense that the current remains on continuously and the furnace is kept charged with ore, although charging and tapping operations are intermittent. As regards the initial reduction step, the use of a submerged-arc type furnace, operating continuously in the manner described, is ordinarily advantageous. The same is true of the beneficiating step, where Cr:Fe ratios of the order of from 5:1 to 10:1 in the final synthetic ore product are desired. However, where it is desired to manufacture a final synthetic ore having a higher Cr:Fe ratio, say about 10:1, and to remove iron as selectively and completely as possible, batch operation and the use of a furnace of the open-arc or Heroult type are advantageous. This makes for a somewhat higher cost of operation but the higher cost is justified by the higher Cr:Fe ratio secured in the synthetic ore product. When batch operation is used in the beneficiating step, longer refining times will of course give higher improvements in the final Cr:Fe ratios.

Example I

In this specific example of my invention I obtained a ferrochromium metal concentrate, unsalable as ferrochromium but useful in the second stage of my process, by first reducing a low grade chromite iron ore analyzing as follows:

| | Per cent |
|---|---|
| $Cr_2O_3$ | 13.85 |
| Iron oxides (calculated as FeO) | 12.00 |
| $Al_2O_3$ | 2.02 |
| MgO | 21.18 |
| $SiO_2$ | 35.70 |
| $CO_2$ (loss on ignition) | 14.80 |

The reduction was effected in an electric furnace of the submerged-arc type, in the presence of 14 parts of CaO and 15 parts of coke (85 per cent fixed carbon) per 100 parts of ore. In the reduction, coke was present in excess at all times, the object being to take care of the $CO_2$ present in the ore, and to effect as complete reduction of all of the iron and all of the chromium as is feasible.

From the operation described, there was obtained a slag amounting to 65 per cent of the original charge, and a metal concentrate containing 42 per cent chromium, 48 per cent iron, 3 per cent silicon and 7 per cent carbon, the chromium:iron ratio being 0.87:1. The slag contained 1.5 per cent $Cr_2O_3$.

100 parts of this metal concentrate were then employed as a reducing agent for the improvement of 720 parts of an ore having a chromium:iron ratio of 2.3:1, in the presence of 370 parts of CaO. The ore beneficiated in this step had the following analysis:

| | Per cent |
|---|---|
| $Cr_2O_3$ | 33.60 |
| Iron oxide (calculated as FeO) | 12.6 |
| $Al_2O_3$ | 28.3 |
| MgO | 14.3 |
| $SiO_2$ | 6.5 |
| CaO | 2.0 |

The beneficiation step was conducted in the batch manner herein described, that is to say, in an electric furnace of the open-arc or Heroult type.

From the specific operation described, I obtained 1131 parts of a glassy ore melt, having a chromium:iron ratio of 29:1, and analyzing as follows:

| | Per cent |
|---|---|
| $Cr_2O_3$ | 26.7 |
| Iron oxides (calculated as FeO) | 0.79 |
| MgO | 9.20 |
| $Al_2O_3$ | 18.00 |
| $SiO_2$ | 6.30 |
| CaO | 34.00 |

This ore melt was readily reduced in the ordinary manner to give a ferrochromium of superior grade. There was also obtained a byproduct metal amounting to 124 parts and containing 8 per cent chromium and about 4 per cent carbon.

It will be observed that enrichment of the chromium:iron ratio in the beneficiated ore was effected by employing a concentrate which itself had a definitely inferior chromium:iron ratio.

The ore employed in the beneficiating step in this example was high in $Al_2O_3$ content, and, therefore, required the use of a rather large amount of CaO. For that reason, the actual $Cr_2O_3$ content of the final ore melt is somewhat reduced, being 26.7 per cent as compared with 33.6 per cent $Cr_2O_3$ in the ore as used. However, this reduction is not serious in view of the greatly heightened Cr:Fe ratio.

As has been indicated elsewhere in this specification, if the beneficiating step is carried out in a submerged arc furnace, in a continuous manner, the operation is less expensive but the final ore melt is lower in Cr:Fe ratio than is true where batch operation is used in this step. However, the Cr:Fe ratio of the final ore melt can always be improved as compared with the Cr:Fe ratio of the original ore.

While in this instance, as is preferred, a sufficient amount of the ferrochromium metal concentrate was employed to furnish sufficient chromium for the reduction of the iron contained in the ore and displaced by CaO from the chromite in the ore, it should be noted that wherever a lesser amount of the metal concentrate is available, coke or other reducing agent may be added to supplement the reducing effect of the metal concentrate, so as to insure that the total amount of reducing agent present shall be sufficient to effect reduction of iron from the ore to the desired extent, that is to say, to such extent as will yield an ore melt of the desired chromium:iron ratio. But the total amount of reducing agent present is always limited to avoid carrying an excessive amount of Cr into the byproduct metal; the best results are secured, insofar as batch operation is concerned, when the amounts of reducing agent and CaO used are such that the byproduct iron contains less than 10 per cent Cr.

It will be recognized that carbon and silicon present in the metal concentrate are also effective as reducing agents in the second or beneficiating step. As a matter of fact, silicon may be used in other forms, that is to say, in the form of the silicon alloys, or silicides, and aluminum may also be used, the proportions being such as to selectively reduce iron from the ore and to leave the chromium oxide for the most part unreduced.

Example II

In this example, two separate portions of the same ore were used in the first or reducing step and in the second or beneficiating step, this ore respectively, having a 1.42:1 ratio of Cr:Fe, and analyzing as follows:

|   | Percent |
|---|---|
| $Cr_2O_3$ | 27.1 |
| Iron oxides (calculated as FeO) | 15.9 |
| $Al_2O_3$ | 4.0 |
| MgO | 28.3 |
| $SiO_2$ | 16.5 |
| $CO_2$ | 6.0 |

One portion of this ore was reduced with coke, the amount of coke used being sufficient to reduce $Cr_2O_3$, iron oxide and $CO_2$, plus about 10 per cent in excess, or 13.6 parts of coke (85 per cent fixed carbon) per 100 parts of ore. In this direct reduction step, from 100 parts of ore there were obtained 50 parts of slag and 33 parts of metal concentrate. The slag obtained had the following composition:

|   | Percent |
|---|---|
| $Cr_2O_3$ | 1.5 |
| MgO | 56 |
| $SiO_2$ | 32.7 |
| $Al_2O_3$ | 8.3 |

The metal obtained in this step had the following composition:

|   | Percent |
|---|---|
| Chromium | 56.3 |
| Iron | 36.4 |
| Carbon | 8.0 |
| Silicon | 3.0 |

It will be noted that 100 per cent of the total Fe content and about 95 per cent of the total Cr content were recovered in this operation. It will also be noted that in view of the high content of MgO (or $MgCO_3$) in the ore, it was unnecessary to add lime in the direct reduction step.

In the second or beneficiating step, a second portion of the same ore, amounting to 700 parts by weight, was fused in the presence of 86 parts of CaO and 100 parts of the metal concentrate produced in the first step. This step was conducted in a batch manner, in a furnace of the open-arc type, using a relatively short (and hence highly economical) refining time.

From this step there were recovered 108 parts of byproduct iron containing 4.7 per cent chromium, and 653 parts of a glassy ore melt, having a chromium:iron ratio of 6.8:1 and analyzing as follows:

|   | Percent |
|---|---|
| $Cr_2O_3$ | 38.6 |
| Iron oxides (calculated as FeO) | 4.9 |
| MgO | 25.6 |
| $Al_2O_3$ | 3.8 |
| $SiO_2$ | 15.8 |
| CaO | 11.0 |

It will be noted that in this example, the $Cr_2O_3$ content of the final ore melt was higher than that of the original ore, the $Cr_2O_3$ in the final ore melt being present largely as magnesium chromite.

When the second step is conducted in a continuous manner, in a submerged-arc type furnace, a similar Cr:Fe ratio (up to say 10:1) is obtainable, and at a somewhat lower cost.

With batch operation, in a furnace of the open-arc or Heroult type, but using a longer refining time for the beneficiating step, further improvement in the Cr:Fe ratio of the final ore melt can be obtained, at a somewhat higher cost.

It will be obvious to those skilled in the art that considerable flexibility is possible, one of the objects achieved by means of my process being to secure an economic balance between the treatment of two ores of different grade. It will further be obvious to those skilled in the art that while I have described my invention in detail, my invention is not limited to such illustrative examples and details except in accordance with the claims hereinafter made.

What I claim is:

1. A process of utilizing natural chrome iron ore in the production of chromium and chromium alloys which comprises reducing one portion of said ore to produce a chromium-iron alloy, continuously fusing another portion of said ore in contact with said alloy in a molten condition, the proportions of ore and alloy, the temperature and the time of contact being sufficient to effect a substantial amount of reduction of iron from the fused ore by oxidation of chromium from the alloy with a substantial increment of chromium oxid in said ore, separating a low-chromium, high iron metal from the high-chromium fused ore, and smelting said high-chromium ore with a reducing agent so as to obtain a metal containing more than 70 per cent chromium.

2. A process which comprises making ferrochromium by reduction of substantially all the iron and chromium of natural chrome iron ore, continuously oxidizing the chromium of said ferrochromium under basic conditions by a metallic oxid in such an amount and at such a temperature as to form a fused basic chromite ore containing chromium oxid and iron oxid in a ratio of iron to chromium less than 23 to 77 and to leave an iron metal low in chromium and separating the fused ore from the metal.

3. The process of treating natural ferrous chromite ore for production of an artificial ore with a heightened ratio of chromium to iron and with production of metallic iron as a byproduct which comprises continuously fusing such an ore in the presence of sufficient added base to displace a substantial amount of the ferrous oxid in combination with chromic oxid, reducing the displaced ferrous oxid to metal by means of carbon contained in a carbon-rich alloy and separating the metal from the fused melt, whereby a melt is obtained rich in chromite of the added base, low in iron and of basic nature.

4. The process of treating natural ferrous chromite ore for production of an artificial ore with a heightened ratio of chromium to iron and with production of metallic iron as a byproduct which comprises continuously fusing such an ore in the presence of sufficient added base to displace a substantial amount of the ferrous oxid in combination with chromic oxid, reducing the displaced ferrous oxid to metal by means of ferrochromium containing carbon and separating the metal from the fused melt, whereby a melt is obtained rich in chromite of the added base, low in iron and of basic nature.

5. In the process of claim 2, oxidizing the chromium of the ferrochromium at the expense of the iron oxid of natural chrome iron ore so as to form a beneficiated chrome ore containing an increment of chromium oxid and a decrement of iron oxid.

6. In the process of claim 2, oxidizing the chromium of the ferrochromium by iron oxid.

7. In the process of claim 2, oxidizing the chromium of the ferrochromium by iron ore.

8. The process of treating natural ferrous chromite ore for production of an artificial ore with a heightened ratio of chromium to iron and with production of metallic iron as a byproduct which comprises continuously fusing such an ore in the presence of sufficient added base to displace a substantial amount of the ferrous oxid in combination with chromic oxid, reducing the displaced ferrous oxid to metal by means of silicon and separating the metal from the fused melt, whereby a melt is obtained rich in chromite of the added base, low in iron and of basic nature.

9. The process of treating natural ferrous chromite ore for production of an artificial ore with a heightened ratio of chromium to iron and with production of metallic iron as a byproduct which comprises continuously fusing such an ore in the presence of sufficient added base to displace a substantial amount of the ferrous oxid in combination with chromic oxid, reducing the displaced ferrous oxid to metal by means of silicon contained in a silicon alloy and separating the metal from the fused melt, whereby a melt is obtained rich in chromite of the added base, low in iron and of basic nature.

10. The process of making a synthetic calcium chromite ore, which comprises reducing a chromite ore to obtain at least an 80 per cent recovery of ferrochrome metal therefrom, in the presence of sufficient slag-forming ingredients to convert the gangue of the ore to a slag low in metallic values, discarding the slag, fusing the metal thereby recovered in the presence of a chromite ore and added CaO, to replace and reduce iron oxide from the ore, thereby forming calcium chromite while also oxidizing chromium of the metal into calcium chromite, and separating as final products a ferrous metal low in chromium and an improved basic ore having a higher Cr:Fe ratio, and containing a higher percentage of Cr in chromite form, than the original chromite ore.

11. The process of making a synthetic calcium chromite ore, which comprises reducing a chromite ore to obtain at least an 80 per cent recovery of ferrochrome metal therefrom, in the presence of sufficient slag-forming ingredients to convert the gangue of the ore to a slag low in metallic values, discarding the slag, fusing the metal thereby recovered in the presence of a chromite ore and added CaO, to replace and reduce iron oxide from the ore, thereby forming calcium chromite while also oxidizing chromium of the metal into calcium chromite, and separating as final products a ferrous metal low in chromium and an improved basic ore substantially free from FeO and containing a higher percentage of Cr, in the form of calcium chromite than the original chromite ore.

12. The process of making an improved chromite ore suitable for direct reduction to ferrochromium of marketable grade, which comprises reducing a low grade chromite ore to metal, discarding the gangue of the ore in the form of a slag, fusing a more concentrated chromite ore in the presence of the thereby recovered metal and added lime to replace and reduce FeO from said ore, the proportions of ore, metal reducing agent and lime being such as to produce an ore melt having a heightened chromium:iron ratio and a heightened Cr content, Cr being present in the form of a chromite, and separating the thereby improved ore and a ferrous metal low in chromium.

13. The process of making an improved chromite ore suitable for direct reduction to ferrochromium of marketable grade, which comprises reducing a low-grade chromite ore to metal, discarding the gangue of the ore in the form of a slag, fusing a more concentrated chromite ore having a Cr:Fe ratio lower than 2:1 in the presence of the thereby recovered metal and added lime to replace and reduce FeO from said ore, the proportions of ore, metal reducing agent and lime being such as to produce an ore metal having a Cr:Fe ratio higher than 2:1 and a heightened Cr content, Cr being present in the form of a chromite, and separating the thereby improved ore and a ferrous metal low in chromium.

14. The process of making an improved chromite ore suitable for direct reduction to ferrochromium of marketable grade, which comprises fusing a chromite ore in the presence of a ferrochrome metal and added lime, to replace and reduce FeO from said ore, the amount of lime being such as to combine as calcium chromite with the $Cr_2O_3$ originally present as $FeO.Cr_2O_3$ in the ore and from which FeO is reduced by chromium contained in said metal, and with $Cr_2O_3$ produced by oxidation of said chromium, and the total reducing agent present being insufficient to effect substantial reduction of $Cr_2O_3$ from the calcium chromite formed, thereby producing an ore melt having a heightened chromium:iron ratio and a heightened Cr content, and separating the thereby improved ore and a ferrous metal low in chromium.

15. The process of making an improved chromite ore suitable for direct reduction of ferrochromium of marketable grade, which comprises fusing a chromite ore in the presence of iron, chromium, carbon and added lime, the proportions of ore, chromium, carbon and lime being controlled to effect replacement of FeO in the ore by CaO, reduction of replaced FeO to iron, and oxidation of chromium to $CaO.Cr_2O_3$, without reducing $Cr_2O_3$ present in the ore to any substantial extent, and separating as final products a ferrous metal low in chromium and an ore melt having a heightened chromium:iron ratio and a heightened content of Cr, in chromite form.

16. The process of making an improved chromite ore suitable for direct reduction to ferrochromium of marketable grade, which comprises reducing a low grade chromite ore to metal, discarding the gangue of the ore in the form of a slag, fusing a second batch of chromite ore in the presence of the thereby recovered metal and added lime to transfer chromium from said metal, as calcium chromite, into the fused ore, while transferring iron from the ore into the metal, and separating the low-chromium ferrous metal and the ore, rich in calcium chromite, thereby obtained.

17. The process of making a calcium chromite ore substantially free from iron oxide, which comprises reducing a chromite ore of low $Cr_2O_3$ content but having a high Cr:Fe ratio, to obtain a substantially complete recovery of ferrochrome metal therefrom, in the presence of sufficient slag-forming ingredients to convert the gangue of the ore to a slag substantially free from metallic values, discarding the slag, fusing the metal thereby removed in the presence of a more concentrated chromite ore and added CaO, to replace and reduce iron oxide from the ore, thereby forming calcium chromite while also oxidizing chromium of the metal into the ore melt as calcium chromite, and separating as final products a ferrous metal low in chromium and an improved basic ore substantially free from FeO and containing a higher percentage of Cr, in chromite form, than either of the original chromite ores.

18. The process of making an improved chromite ore suitable for direct reduction to ferrochromium of marketable grade, which comprises fusing a chromite ore having a Cr:Fe ratio less than 2:1 in the presence of sufficient amounts of chromium, in the form of a ferrochrome metal, and added lime, to replace and reduce enough FeO from said ore to raise the Cr:Fe ratio of the ore melt to a value of at least 70:30, without reducing the Cr content of the ore melt.

19. The process of selectively reducing iron from a chromite ore unsuitable for direct reduction to ferrochromium of marketable grade, to convert it into a new concentrated synthetic chromite ore suitable for direct reduction to ferrochromium of marketable grade, fusing said ore in the presence of a ferrochrome metal, and added lime, in such proportions as to permit conversion of ferrous chromite in the ore to calcium chromite with reduction of iron and conversion of chromium in said metal to calcium chromite, while restraining reduction of chromium oxide, and separating the combined calcium chromites thereby formed as an ore melt from the molten iron present in the added metal and reduced from the ore treated.

20. In a process of making an improved chromite ore by fusing said ore in the presence of a reducing agent and added CaO, to replace and reduce iron oxide from the ore, thereby forming calcium chromite, and separating as final products a ferrous metal low in chromium and an improved basic ore having a higher Cr:Fe ratio than the original ore, the improvement which comprises simultaneously enriching the ore in Cr content by employing as at least a portion of said reducing agent a chromium-containing metal and controlling the amount of CaO to effect an oxidation of chromium contained in said metal into the ore, as calcium chromite.

MARVIN J. UDY.

CERTIFICATE OF CORRECTION.

Patent No. 2,127,074.  August 16, 1938.

MARVIN J. UDY.

It is hereby certified that error appears in the printed specification of the above numbered patent requiring correction as follows: Page 6, second column, line 47, claim 13, for the word "metal" read melt; and that the said Letters Patent should be read with this correction therein that the same may conform to the record of the case in the Patent Office.

Signed and sealed this 13th day of September, A. D. 1938.

Henry Van Arsdale (Seal)  Acting Commissioner of Patents.

proportions of ore, chromium, carbon and lime being controlled to effect replacement of FeO in the ore by CaO, reduction of replaced FeO to iron, and oxidation of chromium to $CaO.Cr_2O_3$, without reducing $Cr_2O_3$ present in the ore to any substantial extent, and separating as final products a ferrous metal low in chromium and an ore melt having a heightened chromium:iron ratio and a heightened content of Cr, in chromite form.

16. The process of making an improved chromite ore suitable for direct reduction to ferrochromium of marketable grade, which comprises reducing a low grade chromite ore to metal, discarding the gangue of the ore in the form of a slag, fusing a second batch of chromite ore in the presence of the thereby recovered metal and added lime to transfer chromium from said metal, as calcium chromite, into the fused ore, while transferring iron from the ore into the metal, and separating the low-chromium ferrous metal and the ore, rich in calcium chromite, thereby obtained.

17. The process of making a calcium chromite ore substantially free from iron oxide, which comprises reducing a chromite ore of low $Cr_2O_3$ content but having a high Cr:Fe ratio, to obtain a substantially complete recovery of ferrochrome metal therefrom, in the presence of sufficient slag-forming ingredients to convert the gangue of the ore to a slag substantially free from metallic values, discarding the slag, fusing the metal thereby removed in the presence of a more concentrated chromite ore and added CaO, to replace and reduce iron oxide from the ore, thereby forming calcium chromite while also oxidizing chromium of the metal into the ore melt as calcium chromite, and separating as final products a ferrous metal low in chromium and an improved basic ore substantially free from FeO and containing a higher percentage of Cr, in chromite form, than either of the original chromite ores.

18. The process of making an improved chromite ore suitable for direct reduction to ferrochromium of marketable grade, which comprises fusing a chromite ore having a Cr:Fe ratio less than 2:1 in the presence of sufficient amounts of chromium, in the form of a ferrochrome metal, and added lime, to replace and reduce enough FeO from said ore to raise the Cr:Fe ratio of the ore melt to a value of at least 70:30, without reducing the Cr content of the ore melt.

19. The process of selectively reducing iron from a chromite ore unsuitable for direct reduction to ferrochromium of marketable grade, to convert it into a new concentrated synthetic chromite ore suitable for direct reduction to ferrochromium of marketable grade, fusing said ore in the presence of a ferrochrome metal, and added lime, in such proportions as to permit conversion of ferrous chromite in the ore to calcium chromite with reduction of iron and conversion of chromium in said metal to calcium chromite, while restraining reduction of chromium oxide, and separating the combined calcium chromites thereby formed as an ore melt from the molten iron present in the added metal and reduced from the ore treated.

20. In a process of making an improved chromite ore by fusing said ore in the presence of a reducing agent and added CaO, to replace and reduce iron oxide from the ore, thereby forming calcium chromite, and separating as final products a ferrous metal low in chromium and an improved basic ore having a higher Cr:Fe ratio than the original ore, the improvement which comprises simultaneously enriching the ore in Cr content by employing as at least a portion of said reducing agent a chromium-containing metal and controlling the amount of CaO to effect an oxidation of chromium contained in said metal into the ore, as calcium chromite.

MARVIN J. UDY.

---

CERTIFICATE OF CORRECTION.

Patent No. 2,127,074.                          August 16, 1938.

MARVIN J. UDY.

It is hereby certified that error appears in the printed specification of the above numbered patent requiring correction as follows: Page 6, second column, line 47, claim 13, for the word "metal" read melt; and that the said Letters Patent should be read with this correction therein that the same may conform to the record of the case in the Patent Office.

Signed and sealed this 13th day of September, A. D. 1938.

Henry Van Arsdale

Acting Commissioner of Patents.

(Seal)